Nov. 18, 1924.

J. E. FARRELL, JR 1,516,005

FLUID CLUTCH

Filed Aug. 4, 1920 2 Sheets—Sheet 1

Inventor
Joseph E. Farrell Jr
By his Attorney

Nov. 18, 1924.

J. E. FARRELL, JR 1,516,005

FLUID CLUTCH

Filed Aug. 4, 1920     2 Sheets-Sheet 2

Inventor
Joseph E. Farrell Jr
By his Attorney

Patented Nov. 18, 1924.

1,516,005

UNITED STATES PATENT OFFICE.

JOSEPH EDWARD FARRELL, JR., OF WASHINGTON, DISTRICT OF COLUMBIA, ASSIGNOR TO HYDRAULIC DEVICES CORPORATION OF DELAWARE.

FLUID CLUTCH.

Application filed August 4, 1920. Serial No. 401,258.

*To all whom it may concern:*

Be it known that I, JOSEPH EDWARD FARRELL, Jr., a citizen of the United States of America, and residing in the city of Washington, District of Columbia, have invented a new and useful Fluid Clutch, of which the following is a specification.

This invention addresses itself specifically to a clutch proposition and is not to be considered as a fluid transmission device and it embodies more particularly two clutch members, namely, a driving member and a driven member having between them an annular space providing a chamber for a suitable fluid, which fluid is static with reference to both the driving and driven members, when the clutch is "thrown in", but is propelled through the channel by the driving member when the clutch is "thrown out" due to the opening of the control valves in the channel.

I also provide means positioned between the driving member and the driven member for establishing a lock of such a nature that it can be gradually brought into play thereby causing a partial rotation of the driven member and finally a complete co-ordination of the driving and driven members; in other words I bring about a complete lock without the aid of a supplementary positive lock brought into action after the driven member has come into complete harmony with the driving member.

As I have engineered and built the present clutch, this accessory or positive clutch becomes unnecessary and I therefore dispense with it and I place, and maintain, the entire burden on the fluid clutch.

Another improvement I have brought about in my present arrangement is the establishment of a fluid track-way for the driving member to run on unimpaired and unimpeded by intervening mechanical devices when the clutch is running free or doing no positive work; heretofore in many devices of this nature there has been an unnecessary thrashing about of certain parts of the driven end of the mechanism even when the clutch was doing no actual work; these unnecessary parts I eliminate.

The chief aims of my invention from a structural standpoint have been simplicity, strength, and compactness; many fluid clutches have been rendered valueless by great multiplicity of parts, involving some weak spots resulting in internal breakages and requiring large sized units to effectually arrive at the efficiency objective.

I will proceed to more particularly describe my invention in connection with the accompanying drawings which form a part of the specification. In these drawings Fig. 1 represents a cross-section of my improved clutch.

Figure 1:
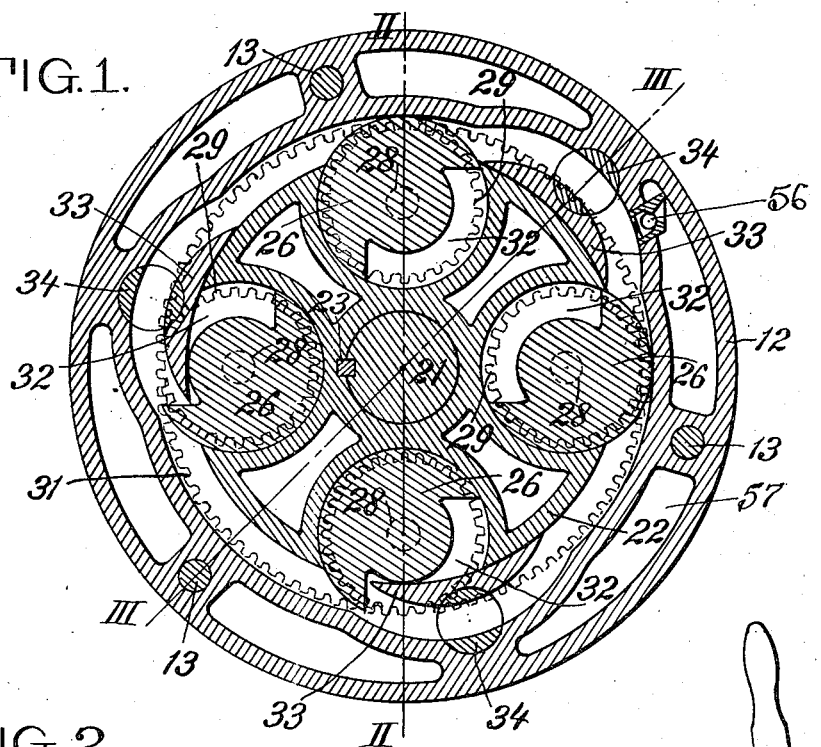

In these drawings 10 is one side of the casing constituting the outer, or driving, member and 11 is the other side; between these two sides is a central member 12; these three parts are secured firmly together by bolts 13 having at their inner ends bolt-heads 14 and at their outer ends nuts 15 which screw on to the threaded ends 16 of the said bolts and by these instrumentalities the three-part casing 10, 11 and 12 is held together. This casing so constructed and assembled constitutes the external or driving member of my clutch.

This driving member receives its power from any suitable source such as the shaft 17 supported in bearings 18 and having a suitable cut-away portion 19 in which the key 20 of the member 11 is positioned. This locks the casing 10, 11 and 12 to the driving shaft 17; any other suitable instrumentalities in this respect may be employed, and I only show this as illustrative.

At 21 I show a shaft forming part of the driven member. It is secured to the main body 22 of the said driven member by the key 23. The driven member is also provided with complementary part 24 which fits over and is firmly secured to the hub 25 of said part 22.

Figure 2:
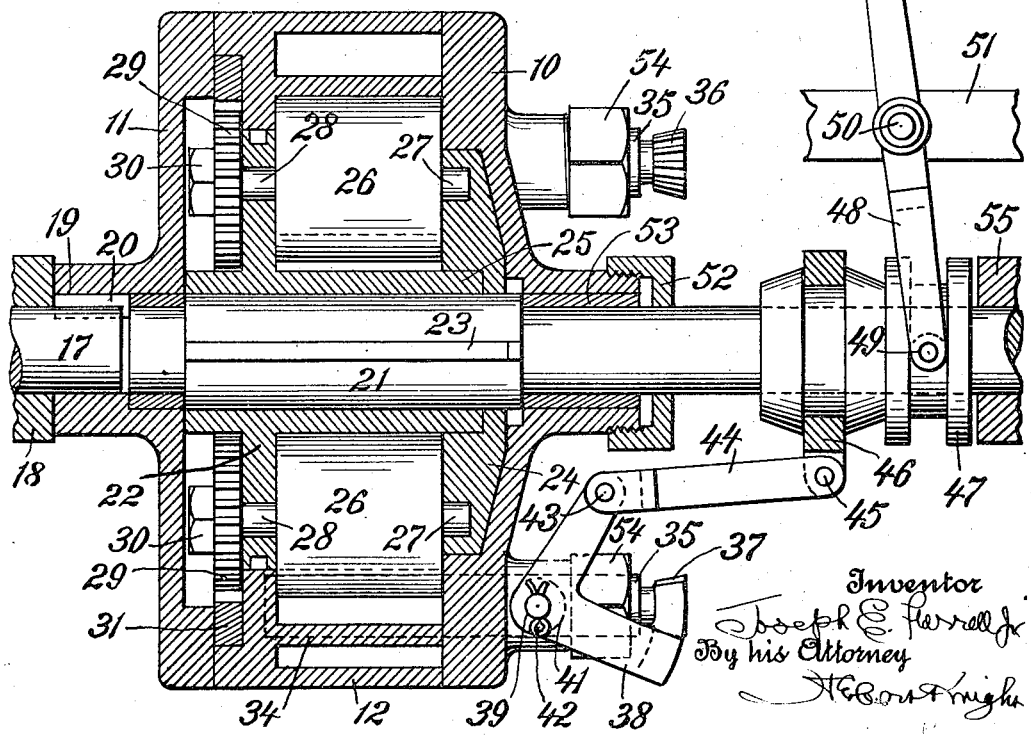
Fig. 2 is a section on the line II—II Fig. 1.
Figure 3:
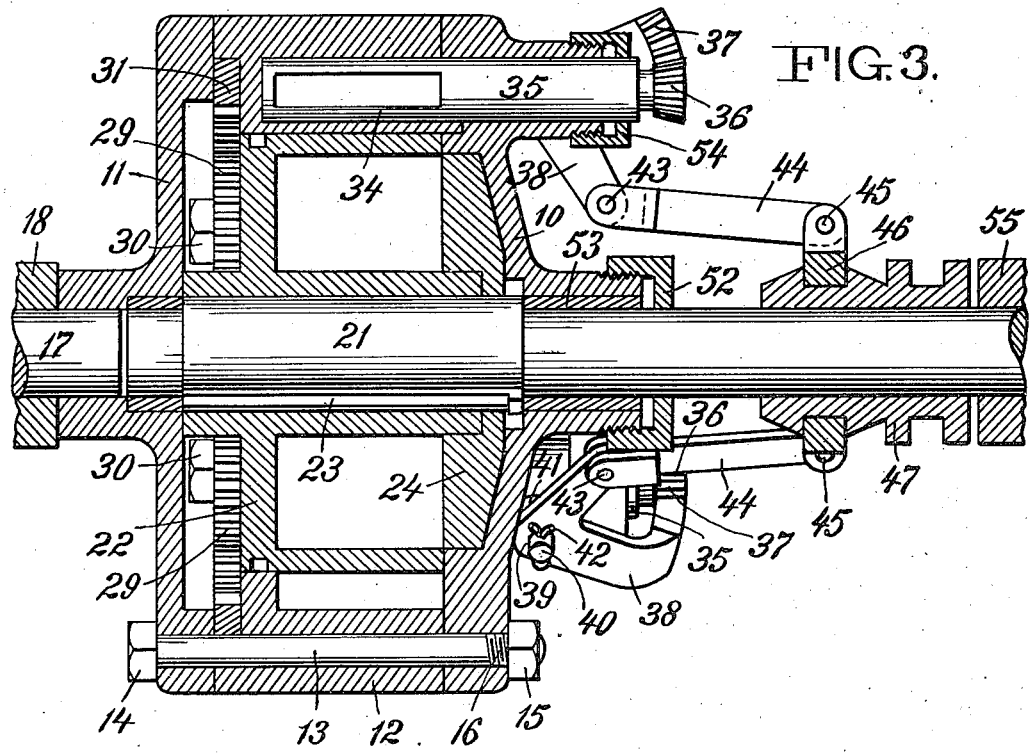
Fig. 3 is a section on the line III—III Fig. 1.

Parts 22 and 24 when brought together as shown in Figures 2 and 3 constitute when properly organized, and connected up to the shaft 21 by the key 23, the driven member of my clutch.

Positioned in the driven member are four cylindrical cams 26 being mounted in the driven member by journals 27 and 28; the latter have gear wheels 29 mounted thereon secured thereto by nuts 30; the gear wheels 29 are fixedly secured to the respective cams 26 by these means. When the gear rotates the cam rotates in unison with it.

Positioned on the inside of the central member 12 of the driving member is an interiorly geared ring 31 fixedly secured to and forming a part of the driving member; it is positioned and arranged to intermesh with the gear wheels 29 so that during the rotation of the driving member to which the ring 31 is fixedly secured the cams 26 will be compelled to turn in unison therewith. As I have engineered my structure one revolution of the driving member and ring 31 will cause each of the cams 26 to turn round three times. It must be understood of course that while the driving member is turning around and the valves, hereinafter described, are open the cams 26 though turning around are doing no work; they are moving freely in the oil; that is all.

Figure 4:
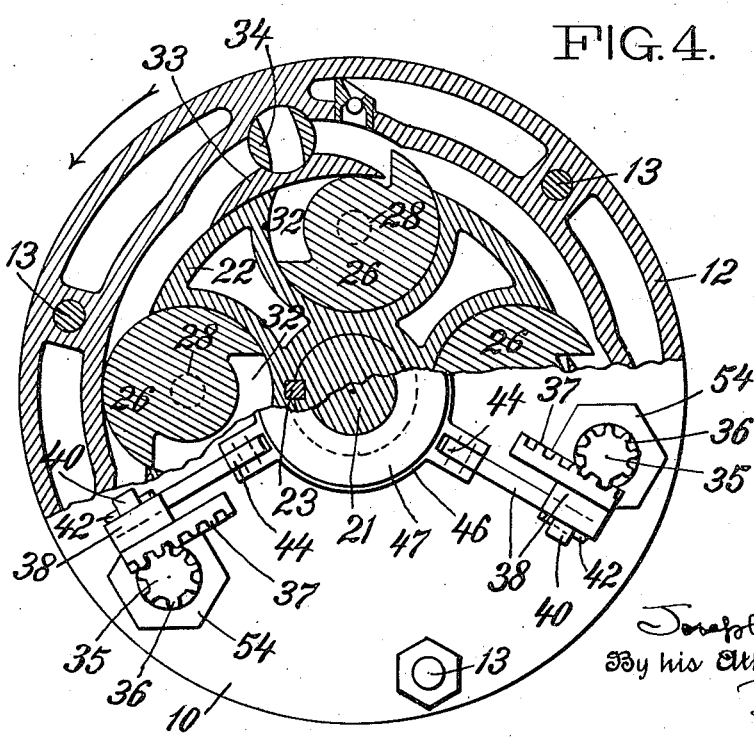
Fig. 4 is an end view of my clutch a part of the casing being broken away; in this figure the clutch is in full operative position.

The cams 26 are cut away or notched as indicated at 32 and clearly shown in Figures 1 and 4 thereby to permit the same to clear the bearing surfaces 33 as the inner and outer casings rotate relatively about each other. It is pointed out that the bearing surfaces 33 are in the nature of relatively thin webs which are carried with the outer or driving housing and constitute a part of the bearing for the inner casing member or rotor 22. That is to say, the members 33 constitute bearing plates located at the valve positions and provide a part of the bearing for the valves 34. By reason of the relatively flat character of the bearing members 33 they offer practically no obstruction in the oil channel, or in other words provide a relatively unobstructed single continuous annular oil channel between the inner and outer members of the device.

At 34 I show valves; these valves when opened as shown in Fig 1 afford a free passage for the fluid therethrough, but as soon as they are turned they begin to block this passage-way and by shutting off the fluid partially or wholly block the rotation of the cams, which blocking will compel the gear 31 to drag the cams bodily in a revolution around the main center 21 and cause them to gradually abandon their rotary movement on their own centers 27 and 28. By this means the entire central unit is driven around and causes the movement in the driving member to be imparted to the driven member to a greater or less extent and finally to its full extent.

These valves 34 extend outwardly in solid form as shown at 35 and are provided at 36 with a beveled pinion which intermeshes with, and is operated by, a rack 37 mounted on an elbow shaped lever 38 swinging at its corner 39 on a pin 40 which latter extends from suitable shoulders 41 on the frame of the driving member.

The cotter pin 42 holds the lever 38 in place. The elbow lever 38 is swiveled at its other end by a pin 43 to a swinging link 44, the latter being suspended by means of a pin 45 to a ring 46, said ring 46 being mounted in the collar 47, the latter being operated by the lever 48 connected to the collar 47 by the pin 49 and hung at 50 on any suitable part 51.

A cap or thimble 52 and a bearing surface 53 are shown for centering the shaft 21 relative to the outer portion of the driving member, and the thimble 54 is shown in a similar position at the outer end of the valve extension 35.

By manipulating the lever 48 the clutch can be thrown open, that is to a dead point, or it can be thrown to partially open, or to an entirely closed and locked position; in the latter position the clutch is working at 100% efficiency and the driving and driven members are going at the same speed.

At 55 is a bearing for the outer end of the shaft 21 and at 56 is a valve for automatically renewing the fluid in the central chamber from the peripheral fluid reserve chamber 57.

I claim:

1. A fluid clutch device including axially aligned driving and driven shafts, an outer casing member having an annular interior wall, web members spaced from said wall, an inner rotor member having its periphery spaced from the annular wall of the casing member and cooperating with said webs to provide a single continuous annular oil channel, throttle valves interposed in the oil channel, and automatically rotatable cams adapted to project across the oil channel and having notches for clearing the said webs.

2. A fluid clutch device including axially arranged driving and driven shafts, a driving housing carried by the driving shaft and rotatable therewith, a driven member keyed to the driven shaft and located within said housing and arranged to provide a continuous interior fluid passage-way, a series of relatively thin webs formed with the housing and providing part of the bearing for the periphery of the driven member, said webs being spaced from the main body of the housing to provide a part of said continuous passage-way, a series of manually controlled valves mounted in the housing at the location of said webs for opening and closing said passage-way, a plurality of rotatable cams carried by the driven member and adapted to block said passage-way at intervals, said cams having clearance portions for avoiding said webs upon relative rotation of the driving and driven members, and means for rotating said cams.

3. A fluid clutch device including axially arranged driving and driven shafts, a driving housing carried by the driving shaft and rotatable therewith, a driven member keyed to the driven shaft and located within said housing and arranged to provide an annular continuous fluid passage-way, a series of relatively thin webs formed with the housing and bearing against the periphery of the driven member, said webs being spaced from the main body of the housing to provide a part of said continuous passage-way, a series of manually controlled valves mounted in the housing at the location of said webs for opening and closing said passage-way, a plurality of rotatable cams carried by the driven member and adapted to block said passage-way at intervals, said cams having clearance portions for avoiding said webs upon the relative rotation of the driving and driven members, gear wheels associated with said cams, and a circular rack carried by the housing and engaging said gear wheels of the cams.

JOSEPH EDWARD FARRELL, Jr.